United States Patent [19]

Silvey

[11] 4,336,726
[45] Jun. 29, 1982

[54] CHAIN STOP FOR SAW CHAIN GRINDER

[76] Inventor: Elmer R. Silvey, 1231 Dutton Rd., Eagle Point, Oreg. 97524

[21] Appl. No.: 148,168

[22] Filed: May 8, 1980

[51] Int. Cl.³ .............................................. B23D 63/16
[52] U.S. Cl. ...................................................... 76/25 A
[58] Field of Search ...................... 76/25 A, 31, 33, 34, 76/35, 36, 37, 40, 41, 42, 43, 75, 76, 77

[56] References Cited

U.S. PATENT DOCUMENTS

| | | | |
|---|---|---|---|
| 2,318,456 | 5/1943 | Blum | 76/43 |
| 3,313,184 | 4/1967 | Granberg | 76/31 |
| 3,779,103 | 12/1973 | Silvey | 76/25 A |

*Primary Examiner*—Roscoe V. Parker

*Attorney, Agent, or Firm*—Klarquist, Sparkman, Campbell, Leigh, Whinston & Dellett

[57] ABSTRACT

A self-adjusting, self-locating chain stop mechanism having a pawl with a notch for receiving the rearward edge of a cutter link of a saw chain is secured to a holder which supports the saw chain in position for sharpening a selected cutter link using a disc-shaped grinding wheel. The movement of the pawl is restricted within a preset range determined by the size of the saw chain to be sharpened, the range of movement permitting the saw chain to be advanced after each cutter link is sharpened without interference from the pawl and preventing movement of the cutter link being sharpened when backed up against the notch on the pawl.

6 Claims, 5 Drawing Figures

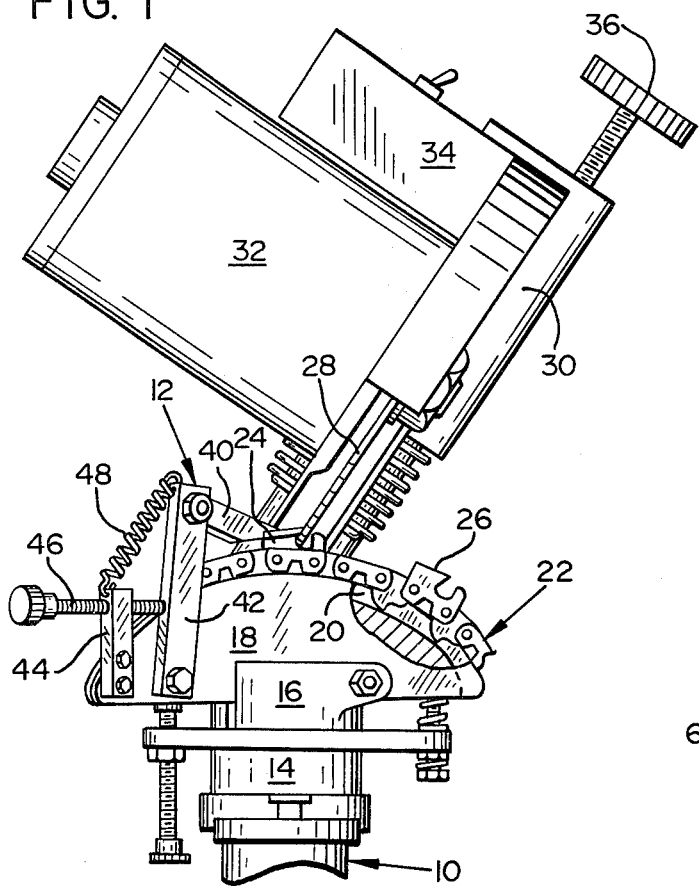
FIG. 1
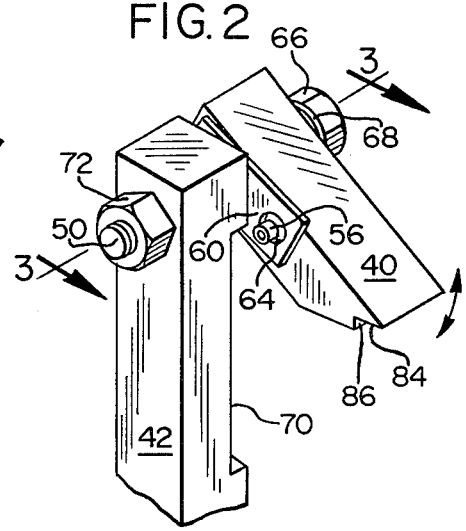
FIG. 2
FIG. 3
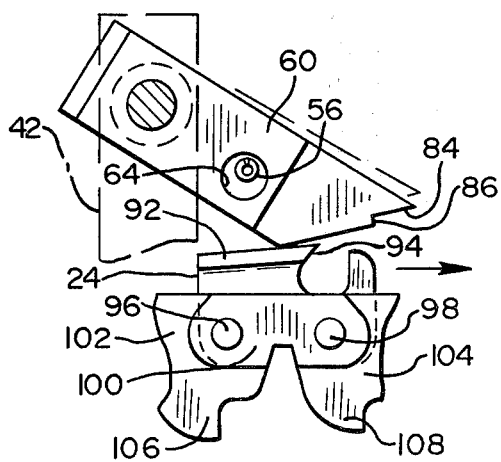
FIG. 4
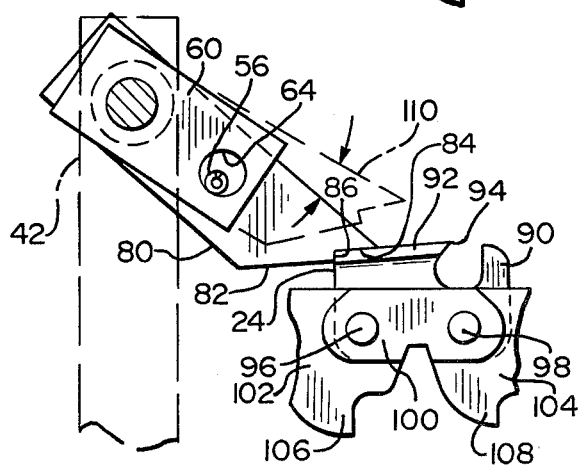
FIG. 5

CHAIN STOP FOR SAW CHAIN GRINDER

The present invention pertains to grinding machines for sharpening the cutting edges of saw chains and has for its principal object the provision of an improved chain stop mechanism for locating and holding a cutter link in proper position relative to a grinding wheel.

The present invention is an improvement over the invention described in U.S. Pat. No. 3,779,103, the terms of which are incorporated by reference herein insofar as they are not inconsistent with the description which follows.

The presently preferred way of carrying out the invention will now be described in detail with reference to the accompanying drawings, in which:

FIG. 1 is a side elevation of the pertinent portions of a grinding machine including an improved chain stop mechanism in accordance with the present invention;

FIG. 2 is a perspective view of the improved chain stop mechanism;

FIG. 3 is a cross-sectional view taken substantially as indicated by line 3—3 in FIG. 2;

FIG. 4 is a schematic side view of a portion of the chain stop mechanism as it would appear in relationship to a cutter link which is being advanced to a sharpening station, the chain stop mechanism being viewed as indicated from the line 4—4 in FIG. 3; and FIG. 5 is a schematic side view similar to FIG. 4 showing the chain stop mechanism holding a cutter link in proper position in the sharpening station.

Referring to FIG. 1, a grinding machine indicated generally by reference numeral 10 includes an improved chain stop mechanism 12. The grinding machine 10 has a frame 14 which includes an upper portion 16 adapted to support a saw chain holder 18. The holder 18 has a slotted convex upper portion 20 adapted to receive a saw chain 22 as shown. As is conventional in the art, the chain 22 includes a plurality of staggered left- and right-hand cutter links, one of each being expressly shown in FIG. 1 and designated respectively by reference numerals 24 and 26. The left-hand cutter link 24 is held by the chain stop mechanism 12 in proper position to be sharpened by a grinding wheel 28. The position in which the cutter link 24 is shown in FIG. 1 will be referred to herein as the sharpening station. The grinding wheel 28 is mounted on an adjustable carriage 30 along with an electric motor 32, switch means 34, and means 36 for adjusting the position of the grinding wheel 28. Additional details of the grinding machine 10 are disclosed in U.S. Pat. No. 3,779,103.

The chain stop mechanism 12 comprises a pawl 40 pivotally secured at one end to the upper end of a support member or lever 42 having its lower end pivotally mounted alongside the holder 18. A vertically extending block 44 is secured to a rearward end of the holder 18. The mechanism 12 further comprises an adjusting screw 46 threaded in the block 44 and a tension spring 48 connected between the upper end of the lever 42 and the upper end of the block 44. The adjusting screw 46 extends horizontally into engagement with a midportion of the lever 42 for adjusting the angle of inclination of the lever 42. The spring 48 urges the lever 42 counterclockwise in view of FIG. 1 to maintain the midportion of the lever in abutting engagement with the threaded end of the screw 46.

Additional details of the chain stop mechanism 12 are illustrated in FIGS. 2 and 3. The pawl 40 is pivotally secured to the lever 42 by means of a bolt 50 extending through the pawl and threaded in the lever. Surrounding the bolt 50 is a cylindrical sleeve 52 upon which the pawl 40 is journaled as depicted in FIG. 3. Retained in a midportion of the pawl 40 is a pin 56 having an end 58 extending out in the direction of the lever 42. Disposed between the pawl 40 and the lever 42 is a lock plate 60 having a first opening 62 through which the bolt 50 passes and a second opening 64 through which the pin 56 passes. Disposed between the pawl 40 and a hex-head portion 66 of the bolt 50 is a spring washer 68. As seen in FIG. 3, the sleeve 52 has an axial dimension which is slightly greater than the width of the pawl 40. Also, the diameter of the first opening 62 of the lock plate 60 through which the bolt 50 passes is smaller than the outside diameter of the sleeve 52. It will be appreciated, therefore, that the sleeve 52 clamps the lock plate 60 against the lever 42 and that the spring washer 68 provides a degree of control over the clamping force. The pawl 40 is free to pivot about the sleeve 52 within a limited range of movement as determined by the diameter of the second opening 64 of the lock plate 60 in relationship to the diameter of the pin 56. However, the lock plate 60 can be pivoted by forcibly pivoting the pawl 40 in either direction beyond its range of free movement so that the initial position of the pawl 40 can be set before proceeding with sharpening. The lever 42 has a recess 70 on the side facing the pawl 40 to provide clearance for the pin 56 so that the lever will not interfere with the pivotal movements of the pawl. The amount of force required to overcome the above-mentioned clamping force in order to pivot the lock plate 60 is large enough that the cutter link 24 being sharpened ordinarily will not move the pawl 40 but small enough that the initial position of the pawl can be set by hand. The tightness of the bolt 50 is adjusted until the desired clamping force is obtained and then a jam nut 72 is tightened down on the threaded end of the bolt 50 against the lever 42 to maintain the desired clamping force.

Referring now to FIGS. 4 and 5, further details of the pawl 40 and cooperating portions of the cutter link 24 will be described. The rotatable end of the pawl 40 has a rearward surface 80 and a lower surface 82 disposed at an obtuse angle preferably of about 135°. A notch defined by first and second surfaces, respectively labeled 84 and 86 in FIG. 4, is provided at the forward lower edge of the pawl 40 and is adapted to engage the rearward upper corner of the cutter link 24 as shown in FIGS. 1 and 5 to hold the cutter link 24 in the sharpening station. The cutter link 24, as shown herein, is a conventional chipper type having a depth gauge 90 disposed ahead of a cutter element 92 which has a cutting edge 94. The cutter link 24 is secured by pivot pins 96 and 98 to a connecting link 100 and drive links 102 and 104, all of which are conventional parts of the saw chain 22. The drive links 102 and 104 include respective downwardly extending portions or drive lugs 106 and 108 which are retained in the slotted upper portion 20 of the holder 18 in the manner depicted in FIG. 1. Lateral movement of the cutter link 24 in the sharpening station is prevented by the retention of the drive lugs 106 and 108 in the slotted upper portion 20 as described more fully in U.S. Pat. No. 3,779,103.

When it is desired to advance the chain 22 as indicated by the arrow in FIG. 4, in order to move a new cutter link into the sharpening station after having lifted the grinding wheel 28 away from the sharpening station, it is only necessary to pull the chain 22 forward since the pawl 40 will pivot up freely and ride over the passing links. The cutter link to be sharpened is moved forward until its rearward corner moves just beyond the second notch surface 86 allowing the first notch surface 84 to fall onto the outer surface of the cutter element 92 and then the cutter link 24 is moved back slightly into the position shown in FIG. 5. The grinding wheel 28 is then moved back into the position shown in FIG. 1 to perform the next sharpening operation. It will be appreciated that the component of the grinding force in the plane of the holder 18 is primarily directed horizontally rearward, there also being a small vertical force component. Provided that the locking plate 60 is preset in the position shown in FIG. 5, such rearwardly directed force is resisted by the second notch surface 86 acting against the rearward corner of the cutter link 24.

The lock plate 60 is preset by forcibly rotating the pawl 40 counterclockwise in the view of FIG. 5 until the pawl passes beyond the position indicated by the dashed outline 110 so that the pin 56, by working against the walls of the opening 64, forces the lock plate 60 counterclockwise somewhat beyond the position shown in FIG. 5. The first cutter link 24 to be sharpened is then moved into the sharpening station under the pawl 40. Next, the pawl is forced down into the position shown in FIG. 5 thereby rotating the lock plate 60 clockwise into the preset position with the pin 56 engaging the walls of the opening 64 as indicated. Once preset in this manner, the lock plate 60 will permit the pawl 40 to move freely within the range defined by the arrows in FIG. 5 but will resist pivotal movement beyond such range. After sharpening the first cutter link, it is only necessary to advance the chain to automatically locate each new cutter link properly in the sharpening station.

It will be appreciated that the above-described chain stop mechanism 12 is essentially self-adjusting for different sizes to saw chains since the position of the lock plate 60 is preset to the size of the first cutter link of each chain to be sharpened. Initial adjustment of the position of the pivotal axis of the pawl 40 may be desirable depending upon the size of the saw chain. Such adjustment can be readily accomplished by turning the adjusting screw 46 shown in FIG. 1 to pivot the lever 42 to a suitable inclination so that the notch surfaces 84 and 86 in the lower surface of the pawl 40 will fit flush against the rearward corner of the cutter link 24 in the manner depicted in FIGS. 1 and 5.

From the foregoing description, it will be appreciated that the present invention provides an improvement over the invention described in U.S. Pat. No. 3,779,103 in which a pawl acts against a rearward vertical surface of the cutter link being sharpened and an upper surface of the adjacent drive link. It has been found that cutter links will occasionally tend to lift up or pivot during sharpening and that this tendency is not prevented in an entirely satisfactory manner by the pawl mechanism described in the the aforementioned patent. However, such tendency is effectively resisted by the downward action of the first notch surface 84 and the forward action of the second notch surface on the rearward corner of the cutter link 24 as described herein with reference to FIG. 5.

Although a preferred embodiment of the invention has been described in detail, it is to be understood that various changes, substitutions and alterations can be made therein without departing from the spirit and scope of the invention as defined in the appended claims.

What is claimed is:

1. A machine for sharpening the cutter links of a saw chain having both cutter links and connecting drive links comprising a grinding wheel, means for supporting the grinding wheel for rotation in a first plane, a holder for supporting the saw chain in a second plane so that a cutter link located in a sharpening station on the holder will have its cutting edge oriented properly for sharpening by the grinding wheel, and a chain stop mechanism mounted adjacent to the sharpening station for holding the cutter link in proper position in the sharpening station, the chain stop mechanism being characterized by:

a pawl pivotally supported for free rotational movement rearwardly of a rotatable working end, a first surface on the rotatable end adapted to contact an outer surface of the cutter link to resist the tendency of the cutter link to lift away from the holder during sharpening, and a second surface on the rotatable end adapted to contact a rearward surface of the cutter link to resist the tendency of the cutter link to move away from the grinding wheel during sharpening; and adjustable limiting means cooperable with the pawl for establishing a lower limit position independent of the saw chain, said limit position being vertically adjustable to accommodate different size saw chains and below which the rotatable end of the pawl cannot drop and permitting free swinging movement of the rotatable end away from the lower limit position to allow the rotatable end to swing above the cutter link by engagement with the cutter link as it passes underneath, the lower limit position being spaced apart from the path of the connecting drive links, the limiting means being operable to enable the rotatable working end of the pawl to automatically drop freely into the lower limit position to engage the cutter link as it reaches the sharpening station with the first surface of the rotatable end in contact with the outer surface of the cutter link and the second surface of the rotatable end in contact with the rearward surface of the cutter link.

2. A machine for sharpening the cutter links of a saw chain comprising a grinding wheel, means for supporting the grinding wheel for rotation in a first plane, a holder for supporting the saw chain in a second plane so that a cutter link located in a sharpening station on the holder will have its cutting edge oriented properly for sharpening by the grinding wheel, and a chain stop mechanism mounted adjacent to the sharpening station for holding the cutter link in proper position in the sharpening station, the chain stop mechanism being characterized by:

a pawl pivotally supported for free rotational movement rearwardly of a rotatable working end, a first surface on the rotatable end adapted to contact an outer surface of the cutter link to resist the tendency of the cutter link to lift away from the holder during sharpening, and a second surface on the rotatable end adapted to contact a rearward edge of the cutter link to resist the tendency of the cutter link to move away from the grinding wheel during sharpening;

limiting means for establishing a lower limit position below which the rotatable end of the pawl cannot drop and permitting free swinging movement of the rotatable end away from the lower limit position to allow the rotatable end to swing above the cutter link by engagement with the cutter link as it passes underneath;

the limiting means being operable to enable the rotatable end of the pawl to automatically drop freely into the lower limit position to engage the cutter link as it reaches the sharpening station with the first surface of the rotatable end in contact with the outer surface of the cutter link and the second surface of the rotatable end in contact with the rearward edge of the cutter link;

a supporting member mounted adjacent to the sharpening station for pivotally supporting the pawl;

the limiting means comprising a lock plate disposed between the pawl and the supporting member;

clamping means for clamping the lock plate against the supporting member with a predetermined force; and means for coupling the pawl to the lock plate so that the lock plate will positively oppose rotational movement of the pawl beyond the lower limit position.

3. The machine of claim 2 wherein the clamping means comprises a cylindrical sleeve upon which the pawl is journaled and means for resiliently urging the sleeve against the lock plate in the direction toward the support member.

4. The machine of claim 3 wherein the sleeve urging means comprises a spring washer compressed by a threaded fastener against the end of the sleeve opposite from the lock plate.

5. The machine of claim 2 wherein the coupling means comprises a pin secured in the pawl for engaging portions of the lock plate, the lock plate limiting the free movement of the pin.

6. An automatically operable chain stop for a saw chain grinder which sharpens the cutter links of a saw chain having both cutter links and connecting drive links, and which includes a holder for supporting the saw chain, the chain stop being operable automatically to position a cutter link on the holder at a sharpening station, the chain stop comprising:

a pawl having a cutter link-engaging tip including a first surface adapted to engage an outer surface of the cutter link and a second surface adapted to contact a rearward surface of the cutter link and being pivotally mounted for free rotational movement rearwardly of the tip so that the tip can swing freely into and out of the path of a cutter link as it is advanced to the sharpening station for sharpening and an adjustable limiting means cooperative with the pawl for establishing a lower limit position independent of the saw chain, said limit position being vertically adjustable to accommodate different size saw chains and below which the tip cannot drop and determining the optimum stop position of the tip for engagement with a rearward edge of a cutter link, said stop position of the tip being spaced apart from the path of the connecting drive links, the limiting means being operable to enable free swinging movement of the tip upwardly from the lower limit position to clear a cutter link by advancement of the cutter link on the holder to the sharpening station and to enable the tip to drop freely back to its lower limit position after the cutter link passes by the tip, whereby the cutter link can thereafter be backed against the tip to establish the correct position of the cutter link for sharpening at the sharpening station.

* * * * *